United States Patent
Yu et al.

(10) Patent No.: US 10,540,078 B2
(45) Date of Patent: Jan. 21, 2020

(54) TOUCH SCREEN-BASED ELECTRONIC BOOK AUTOMATIC SCROLLING CONTROL METHOD AND MOBILE TERMINAL

(71) Applicant: HuiZhou TCL Mobile Communication Co., Ltd., HuiZhou (CN)

(72) Inventors: Bin Yu, HuiZhou (CN); Weiqin Yang, HuiZhou (CN)

(73) Assignee: HuiZhou TCL Mobile Communication Co., Ltd., HuiZhou (CN)

(*) Notice: Subject to any disclaimer, the term of this patent is extended or adjusted under 35 U.S.C. 154(b) by 0 days.

(21) Appl. No.: 15/768,778

(22) PCT Filed: Jul. 12, 2016

(86) PCT No.: PCT/CN2016/108886
§ 371 (c)(1),
(2) Date: Apr. 16, 2018

(87) PCT Pub. No.: WO2017/173841
PCT Pub. Date: Oct. 12, 2017

(65) Prior Publication Data
US 2018/0267682 A1    Sep. 20, 2018

(30) Foreign Application Priority Data
Jun. 4, 2016 (CN) .......................... 2016 1 0208648

(51) Int. Cl.
G06F 3/0485    (2013.01)
G06F 3/0488    (2013.01)
G06F 3/0482    (2013.01)

(52) U.S. Cl.
CPC .......... G06F 3/0485 (2013.01); G06F 3/0482 (2013.01); G06F 3/0488 (2013.01)

(58) Field of Classification Search
CPC .. G06F 3/0485; G06F 3/04883; G06F 3/0482; G06F 3/0488; G06F 2203/04808
See application file for complete search history.

(56) References Cited

U.S. PATENT DOCUMENTS

2010/0253620 A1    7/2010 Singhal
2011/0061025 A1 *  3/2011 Walline ................. G06F 3/0485
                                                               715/830

(Continued)

FOREIGN PATENT DOCUMENTS

CN    1025414104 A        7/2012
CN    104182144 A  *     12/2014

(Continued)

*Primary Examiner* — Justin R. Blaufeld
*Assistant Examiner* — Mong-Shune Chung

(57) ABSTRACT

A touch screen-based electronic book automatic scrolling control method may comprise detecting a leftmost column of touch points of a touch screen to obtain an ordinate value $y_l$ of a touch point that has a smallest ordinate value; detecting a rightmost column of touch points of the touch screen to obtain an ordinate value $y_r$ of a touch point that has a largest ordinate value; and based on $y_l$ and $y_r$, calculating a rate at which a content currently displayed on the screen will be scrolled down, and controlling the automatic scrolling down of an electronic book according to the calculated rate.

12 Claims, 2 Drawing Sheets

(56) References Cited

U.S. PATENT DOCUMENTS

2017/0329511 A1* 11/2017 Ueno .................... G06F 3/0488
2017/0336970 A1* 11/2017 Kim ..................... G06F 3/0414

FOREIGN PATENT DOCUMENTS

| CN | 104182144 A | 12/2014 |
| CN | 105159595 A | 12/2015 |
| CN | 105892872 A | 8/2016 |

* cited by examiner

TOUCH SCREEN-BASED ELECTRONIC BOOK AUTOMATIC SCROLLING CONTROL METHOD AND MOBILE TERMINAL

TECHNICAL FIELD

The present invention relates to the field of mobile terminal application; in particular, it relates to a touch screen-based electronic book automatic scrolling control method and a mobile terminal.

BACKGROUND ART

Due to the portability of mobile terminals, more and more users use mobile terminals to read electronic books in their free time or when waiting for buses.

When a user is using a mobile terminal to read an electronic book, the user may slide a finger on the touch screen or press a button in order to finish a page-flipping operation on the electronic book. However, since the screen of the mobile terminal is relatively small, and accordingly only a small part of the text is shown on the screen, the user may frequently execute such page-flipping operation in order to view other contents of the electronic book.

SUMMARY OF THE INVENTION

The embodiments of the present invention provide a touch screen-based electronic book automatic scrolling control method and a mobile terminal, which is able to solve the following technical problems in the prior art that when using a mobile terminal to read an electronic book, a user may flip the pages of the electronic book by sliding a finger on the touch screen, or press a button or by other methods. This may frequently lead to the issue of finger fatigue; in addition, there may be a short time period during the page-flipping operation when no text is shown in the screen of the mobile terminal, which can compromise the display efficiency of an electronic book. The present invention employs the following technical solution to solve the foregoing technical problems:

A touch screen-based electronic book automatic scrolling control method, comprising:

detecting a leftmost column of touch points of a touch screen to obtain an ordinate value $y_l$ of a touch point that has a smallest ordinate value; detecting a rightmost column of touch points of the touch screen to obtain an ordinate value $y_r$ of a touch point that has a largest ordinate value; and based on the ordinate value $y_l$ and the ordinate value $y_r$, calculating a rate at which the content currently displayed on the screen will be scrolled down according to the formula $(y_r-y_l)/Y_M$, and controlling the automatic scrolling down of an electronic book according to the calculated rate, wherein $Y_M$ is the maximum ordinate value of the touch screen;

wherein the leftmost column of touch points of the touch screen are all the touch points whose abscissa values can satisfy x=0; the rightmost column of touch points of the touch screen are all the touch points whose abscissa values can satisfy $x=X_M$, and $X_M$ is a width of the touch screen.

The method may further comprise the following step prior to the steps of detecting the leftmost column of touch points of a touch screen to obtain an ordinate value $y_l$ of the touch point that has the smallest ordinate value; detecting the rightmost column of touch points of the touch screen to obtain an ordinate value $y_r$ of the touch point that has the largest ordinate value: pre-starting an automatic scrolling function of the electronic book.

The method may further comprise the following step prior to the step of pre-starting an automatic scrolling function of the electronic book: presetting an automatic scrolling control sub-menu in a menu of the electronic book; wherein the automatic scrolling control sub-menu is configured to allow a user to select to open or close the automatic scrolling function of the electronic book.

The method further may comprise the following step prior to the step of pre-starting an automatic scrolling function of the electronic book: presetting a key, and using the key for releasing the automatic scrolling control of the electronic book. The key can be a touch key or a physical key.

The method can further comprise the following step prior to the step of, based on the ordinate value $y_l$ and the ordinate value $y_r$, calculating a rate at which a content currently displayed on the screen will be scrolled down, and controlling an automatic scrolling down of an electronic book according to the calculated rate: detecting the leftmost column of touch points of a touch screen to obtain an ordinate value $y_r$ of a touch point that has the largest ordinate value; detecting the rightmost column of touch points of the touch screen to obtain an ordinate value $y_l$ of a touch point that has the smallest ordinate value.

A touch screen-based electronic book automatic scrolling control method, comprising:

detecting the leftmost column of touch points of the touch screen to obtain an ordinate value $y_l$ of the touch point that has the smallest ordinate value; detecting the rightmost column of touch points of the touch screen to obtain an ordinate value $y_r$ of a touch point that has the largest ordinate value; and based on the ordinate value $y_l$ and the ordinate value $y_r$, calculating a rate at which the content currently displayed on the screen will be scrolled down, and controlling the automatic scrolling down of the electronic book according to the rate.

The step of, based on the ordinate value $y_l$ and the ordinate value $y_r$, calculating a rate at which the content currently displayed on the screen will be scrolled down, and controlling the automatic scrolling down of an electronic book according to the rate may comprise:

based on the ordinate value $y_l$ and the ordinate value $y_r$, calculating a rate at which the content currently displayed on the screen will be scrolled down according to the formula $(y_r-y_l)/Y_M$, and controlling the automatic scrolling down of the electronic book according to the rate, wherein $Y_M$ is the maximum ordinate value of the touch screen.

The leftmost column of touch points of the touch screen may be all the touch points whose abscissa values can satisfy x=0; the rightmost column of touch points of the touch screen may be all the touch points whose abscissa values can satisfy $x=X_M$, and $X_M$ is a width of the touch screen.

The method may further comprise the following step prior to the step of detecting the leftmost column of touch points of a touch screen to obtain an ordinate value $y_l$ of a touch point that has the smallest ordinate value; detecting the rightmost column of touch points of the touch screen to obtain an ordinate value $y_r$ of a touch point that has the largest ordinate value: pre-starting an automatic scrolling function of the electronic book.

The method may further comprise the following step prior to the step of pre-starting an automatic scrolling function of the electronic book: presetting an automatic scrolling control sub-menu in a menu of the electronic book; and the automatic scrolling control sub-menu can be used for allowing a user to select to open or close the automatic scrolling function of the electronic book.

The method may further comprise the following step prior to the step of pre-starting an automatic scrolling function of the electronic book: presetting a key, and the key can be used for releasing the automatic scrolling control of the electronic book. The key can be a touch key or a physical key.

The method may further comprise the following step prior to the step of, based on the ordinate value $y_l$ and the ordinate value $y_r$, calculating a rate at which the content currently displayed on the screen will be scrolled down, and controlling the automatic scrolling down of the electronic book according to the rate: detecting the leftmost column of touch points of the touch screen to obtain an ordinate value $y_r$ of a touch point that has the largest ordinate value; detecting the rightmost column of touch points of the touch screen to obtain an ordinate value $y_l$ of a touch point that has the smallest ordinate value.

A mobile terminal, comprising a touch screen, a central processing unit; wherein the central processing unit may comprise:

a touch point detecting module, which can be used for detecting the leftmost column of touch points of a touch screen to obtain an ordinate value $y_l$ of a touch point that has the smallest ordinate value; and detecting the rightmost column of touch points of the touch screen to obtain an ordinate value $y_r$ of a touch point that has the largest ordinate value; and a scrolling control module, which can be used for, based on the ordinate value $y_l$ and the ordinate value $y_r$, calculating a rate at which the content currently displayed on the screen will be scrolled down, and controlling the automatic scrolling down of an electronic book according to the rate.

The scrolling control module can be specifically used, based on the ordinate value $y_l$ and the ordinate value $y_r$, for calculating a rate at which the content currently displayed on the screen will be scrolled down according to the formula $(y_r-y_l)/Y_M$, and controlling the automatic scrolling down of the electronic book according to the calculated rate, wherein $Y_M$ is the maximum ordinate value of the touch screen.

The touch point detecting module can be used for detecting the leftmost column of touch points of the touch screen, which are all the touch points whose abscissa values can satisfy x=0, and detecting the rightmost column of touch points of the touch screen, which are all the touch points whose abscissa values can satisfy $x=X_M$, and $X_M$ is a width of the touch screen.

In the mobile terminal, the central processing unit may further comprise:

a function starting module, which can be used for pre-starting an automatic scrolling function of the electronic book.

In the mobile terminal, the central processing unit may further comprise:

a first pre-setting module, which can be used for presetting an automatic scrolling control sub-menu in a menu of the electronic book; and the automatic scrolling control sub-menu can be used for allowing a user to select to open or close the automatic scrolling function of the electronic book.

In the mobile terminal, the central processing unit may further comprise: a second pre-setting module, which can be used for presetting a key, and using the key for releasing the automatic scrolling control of the electronic book.

In light of the foregoing, the present invention provides a touch screen-based electronic book automatic scrolling control method and a mobile terminal. The touch screen-based electronic book automatic scrolling control method may comprise detecting the leftmost column of touch points of the touch screen to obtain an ordinate value $y_l$ of a touch point that has the smallest ordinate value; detecting the rightmost column of touch points of the touch screen to obtain an ordinate value $y_r$ of a touch point that has the largest ordinate value; and based on the ordinate value $y_l$ and the ordinate value $y_r$, calculating a rate at which the content currently displayed on the screen will be scrolled down, and controlling the automatic scrolling down of an electronic book according to the calculated rate. In this way, the present invention can improve the display efficiency of the terminal electronic book.

DESCRIPTION OF THE EMBODIMENTS

In order to make the object, technical solutions and effects of the present invention more clear and definite, the present invention will now be described in more detail. It is to be understood that the specific embodiments described herein are merely describing the invention, and are not intended to limit the present invention.

Figure 1:
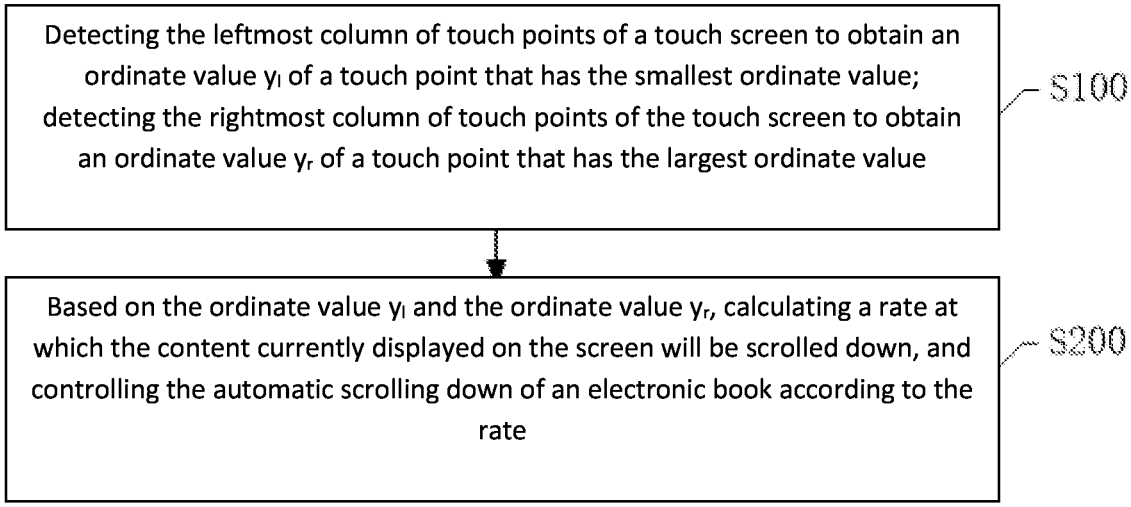
FIG. 1 is a flow chart of the touch screen-based electronic book automatic scrolling control method according to the present invention.

FIG. 1 is a flow chart of the touch screen-based electronic book automatic scrolling control method according to the present invention. In reference to FIG. 1, it can be seen that FIG. 1 shows a touch screen-based electronic book automatic scrolling control method, comprising the following steps:

Step S100, detecting the leftmost column of touch points of a touch screen to obtain an ordinate value $y_l$ of a touch point that has the smallest ordinate value; detecting the rightmost column of touch points of the touch screen to obtain an ordinate value $y_r$ of a touch point that has the largest ordinate value;

Step S200, based on the ordinate value $y_l$ and the ordinate value $y_r$, calculating a rate at which the content currently displayed on the screen will be scrolled down, and controlling the automatic scrolling down of an electronic book according to the calculated rate.

Currently, most mobile terminals have an electronic book installed. The mobile terminal in the embodiments of the present invention will be described using a smartphone with a touch screen as an example. In the embodiments of the present invention, when a smartphone is used to read an electronic book, the smartphone may first detect the leftmost column of touch points of a touch screen, and compare the ordinate values of these touch points, to obtain an ordinate value of the touch point that has the smallest ordinate value; wherein the leftmost column of touch points of the touch screen are all the touch points whose abscissa values can satisfy x=0; wherein, among the touch points whose abscissa values can satisfy x=0, the y value of the touch point with the smallest y value is $y_l$.

Further, the mobile phone may detect the rightmost column of touch points of the touch screen, and compare the ordinate values of these touch points, to obtain an ordinate value $y_r$ of a touch point that has the largest ordinate value;

wherein the rightmost column of touch points of the touch screen are all the touch points whose abscissa values can satisfy $x=X_M$, and $X_M$ is a width of the touch screen; wherein, among the touch points whose abscissa values can satisfy $x=X_m$, the y value of the touch point with the largest y value is $y_r$.

In an embodiment, following obtaining the ordinate value $y_l$ and the ordinate value $y_r$, the mobile terminal can calculate the rate at which the content currently displayed on the screen will be scrolled down according to the formula $(y_r-y_l)/Y_M$, wherein $Y_M$ is the maximum ordinate value of the touch screen; and finally the mobile terminal can control scrolling down of electronic book according to the calculated rate, and the mobile terminal can control the electronic book to automatically scroll down or flip pages according to the foregoing obtained calculated rate.

In an embodiment, prior to implementing the steps for controlling electronic book automatic scrolling, the present invention may implement a series of setting processes. First, the mobile terminal can preset an automatic scrolling control sub-menu in the menu of the electronic book; and the automatic scrolling control sub-menu can be used for allowing a user to select to open or close the automatic scrolling function of the electronic book; at the same time, the mobile terminal can preset a key, and the key can be used for releasing the automatic scrolling control of the electronic book; the foregoing key can be set as either a touch key or a physical key.

When the key has been set as a touch key, when one region in the touch screen has been defined as a touch key, the automatic scrolling control of the electronic book can only be released when the touch key is touched; when other regions of the touch screen are touched, the automatic scrolling control of the electronic book may not be released. When the key has been set as a physical key, it can be a key of the phone, such as the key for controlling volume; and a combination of more than one physical key can be used to replace the touch key mentioned above. For example, the combination of the physical keys may include the volume key plus a start key. Such combination of physical keys can prevent an unintended operation by accident.

In an embodiment, after finishing the foregoing setting, the mobile terminal may start the automatic scrolling function of the electronic book, in order to achieve the automatic scrolling control of the electronic book. Therefore, the mobile terminal may pre-start the automatic scrolling function of the electronic book. The mobile terminal may pre-start detect the leftmost column of touch points of the touch screen to obtain the ordinate value of a touch point that has the smallest ordinate value and detect the rightmost column of touch points of the touch screen to obtain the ordinate value of a touch point that has the largest ordinate value; and based on the foregoing ordinate values, calculate the rate at which the content currently displayed on the touch screen will be scrolled down, and the mobile terminal can control the automatic scrolling down of the electronic book according to the calculated rate.

Figure 2:
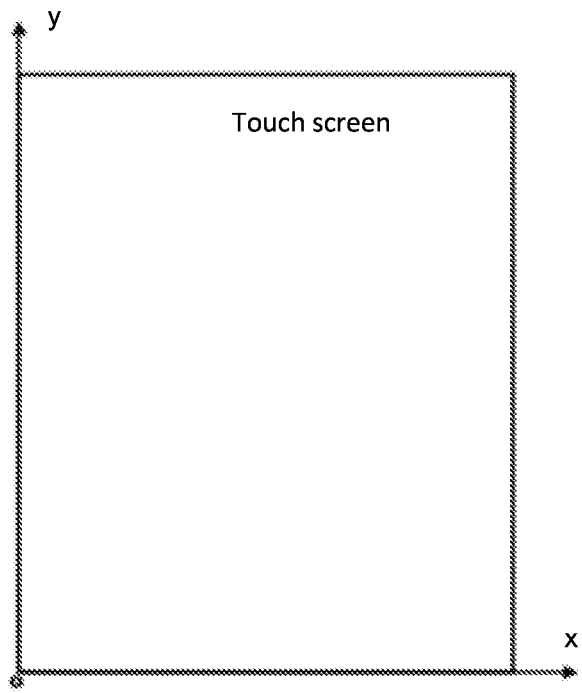
FIG. 2 is a schematic view of touch screen coordinates.

When a touch key has been preset for releasing the automatic scrolling control of the electronic book, after the automatic scrolling function of the electronic book is started, only a touch to one of the following regions of the touch screen of the smartphone may be effective: the leftmost column of touch points of the touch screen; (FIG. 2 is a schematic view of touch screen coordinates); as shown in FIG. 2, the leftmost column of touch points of the touch screen are all the touch points whose abscissa values satisfy $x=0$; the rightmost column of touch points of the touch screen, as shown in FIG. 2, the rightmost column of touch points of the touch screen are all the touch points whose abscissa values can satisfy $x=X_M$, and $X_M$ is a width of the touch screen; the $X_M$ is the maximum abscissa value of the touch screen; a corresponding touch key, as described above.

Figure 3:
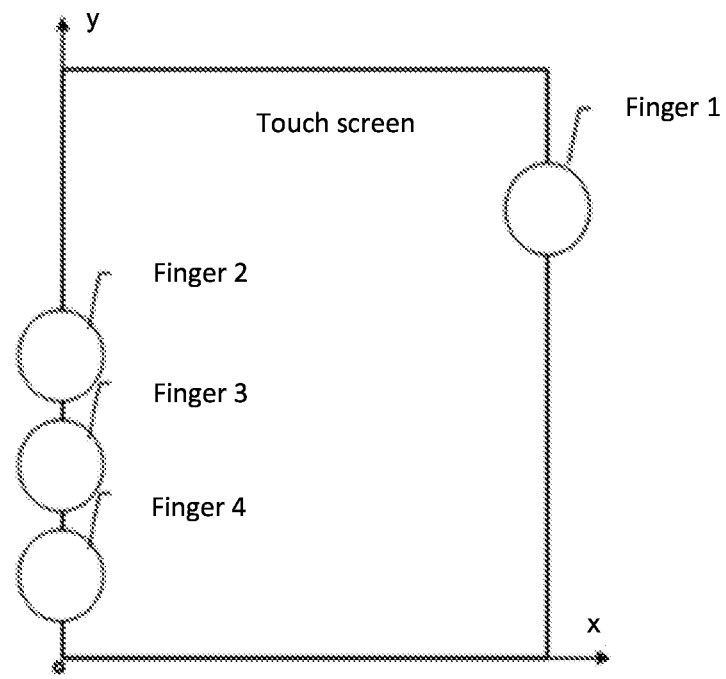
FIG. 3 is a schematic view showing a mobile phone is held in a right hand.

FIG. 3 is a schematic view showing a mobile phone held in a right hand. As shown in FIG. 3, when a user is reading an electronic book from a mobile phone, the mobile phone may be held in the right hand of the user. In this regard, the technical solution of the present invention is proposed based on the common situation that the phone is held in the right hand.

Further, as shown in FIG. 3, when the phone is held in the right hand, the left side of the touch screen of the phone is can be held by three fingers of the user (finger 2, finger 3 and finger 4), and the right side of the touch screen of the phone can be held by the thumb of the user (finger 1). For convenience of description, it has been assumed that the contact between a finger and the touch screen is a single touch point. After the electronic book automatic scrolling function has been started, the phone can automatically detect the leftmost touch points of the touch screen. The three touch points corresponding to the finger 2, finger 3 and finger 4; and then the phone can compare the ordinate values of these three touch points, to obtain the touch point with the smallest ordinate value.

In an embodiment, the touch point corresponding to finger 4 has the smallest ordinate value. Accordingly, the phone can automatically obtain the ordinate value of the touch point of finger 4. At the same time, the phone can automatically detect the rightmost touch points of the touch screen, and then the phone can compare the ordinate values of the touch points, to obtain the touch point with the largest ordinate value.

In an embodiment, the right side of the touch screen is touched by finger 1 alone; accordingly, the ordinate value of this touch point may have the largest ordinate value. Accordingly, the phone can automatically obtain the ordinate value of the touch point of finger 1.

In an embodiment, ordinate values of the touch points of finger 2 and finger 3 are larger than that of the touch point of finger 4; accordingly, when calculating the rate at which the content currently displayed on the screen can be scrolled down (moved down), and the ordinate values of the touch points of finger 1 and finger 4 can be used.

After obtaining the ordinate value of the touch point of finger 4 and the ordinate value of the touch point of finger 4, the phone can calculate the rate at which the content currently displayed on the screen will be scrolled down according to the formula $(yr-y_l)/Y_M$, and then the phone can control automatic scrolling down of electronic book according to the calculated rate. When the user wants to stop reading, the user may touch the touch key mentioned above, which can release the control on electronic book automatic scrolling down function.

In an embodiment, based on the formula $(yr-y_l)/Y_M$, when finger 1 moves up or finger 4 moves down, the rate at which the content currently displayed on the screen will be scrolled down (or moved down) can become faster; while when finger 1 moves down or finger 4 moves up, the rate at which the content currently displayed on the screen will be scrolled down (or moved down) can become slower.

In the case when the mobile phone is held in the left hand of a user, the control method will be similar to that for right hand holding except that the phone can automatically obtain the ordinate value of a leftmost touch point that has the largest ordinate value and the ordinate value of a rightmost touch point that has the smallest ordinate value. The principle for calculations for the foregoing two cases is the same, and therefore will not be repeated herein.

The phone may first determine the holding manner for the phone, and then implement a corresponding control process. As for the determination for the holding manner for the phone, the technology is available in the art, such as using a thermal sensing means, and therefore will not be repeated herein.

Therefore, the present invention provides a touch screen-based electronic book automatic scrolling control method, which is able to enable the electronic book displayed on a mobile terminal to automatically scroll down; in addition, a user can adjust the rate at which the content currently displayed on the screen will be scrolled down by simply holding the mobile terminal. The present invention provides beneficial convenience for a user to read an electronic book with a mobile terminal, and can effectively eliminate finger fatigue caused by touching the screen.

It is understood for a person of ordinary skill in the art that all of the steps or a part of the steps of the method of the embodiment of the present invention can be implemented by certain program instruction related hardware. The program may be stored in a computer-readable storage medium. When executing the program, the procedure of the method described above will be implemented. In this context, the storage medium may be a magnetic disk, an optical disk, a read-only memory (ROM), a random-access memory (RAM) or the like.

Figure 4:
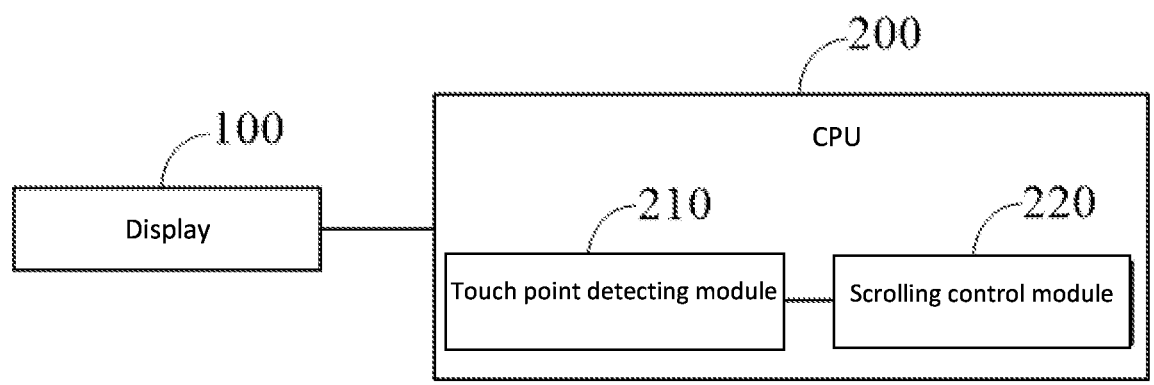
FIG. 4 is a schematic diagram showing the central processing unit (CPU) of the mobile terminal according to present invention.

The present invention also provides a mobile terminal, comprising a touch screen 100, a central processing unit 200; wherein the touch screen 100 is used for displaying information inputted by a user or the information provided for the user, as well as a variety of different graphical user interfaces, wherein the graphical user interface may be formed by a graph, a text, an icon, a video and other combinations. The central processing unit 200 is the control center of the mobile terminal, using various interfaces and wires it is able to connect other parts of the mobile terminal, as well as monitor the entire mobile terminal by way of running or executing various software programs and/or modules. As shown in FIG. 4, the central processing unit 200 comprises a touch point detecting module 210 and a scrolling control module 220, in which:

the touch point detecting module 210 is used for detecting the leftmost column of touch points of a touch screen to obtain an ordinate value $y_l$ of a touch point that has the smallest ordinate value; and detecting the rightmost column of touch points of the touch screen to obtain an ordinate value $y_r$ of a touch point that has the largest ordinate value. See the previous detailed descriptions.

The scrolling control module 220 is used for, based on the ordinate value $y_l$ and the ordinate value $y_r$, calculating a rate at which the content currently displayed on the screen will be scrolled down, and controlling the automatic scrolling down of an electronic book according to the rate.

The central processing unit can further comprise: a function starting module, which can be used for pre-starting an automatic scrolling function of the electronic book.

The central processing unit can further comprise: a first pre-setting module, which can be used for presetting an automatic scrolling control sub-menu in a menu of the electronic book; and the automatic scrolling control sub-menu can be used for allowing a user to select to open or close the automatic scrolling function of the electronic book. See the previous detailed descriptions.

The central processing unit can further comprise: a second pre-setting module, which can be used for presetting a key, and the key can be used for releasing the automatic scrolling control of the electronic book. See the previous detailed descriptions.

In summary, the present invention provides a touch screen-based electronic book automatic scrolling control method and a mobile terminal. The method may comprise detecting the leftmost column of touch points of a touch screen to obtain an ordinate value $y_l$ of a touch point that has the smallest ordinate value; detecting the rightmost column of touch points of the touch screen to obtain an ordinate value $y_r$ of a touch point that has the largest ordinate value; and based on $y_l$ and $y_r$, calculating a rate at which the content currently displayed on the screen will be scrolled down, and controlling the automatic scrolling down of an electronic book according to the calculated rate. In this way, a user can adjust the rate of automatic scrolling down by simply holding the mobile terminal. The present invention provides beneficial convenience for user to read an electronic book with a mobile terminal, and effectively eliminates finger fatigue caused by frequently flipping pages through touching the screen. Therefore, the present invention makes it convenient to a user to read an electronic book with a mobile terminal.

It is understood that the application of the present invention is not limited to the foregoing examples. A person ordinary skill in the art is able to make modifications or changes based on the foregoing description; and all of these modifications and changes are within the scope of the appended claims of the present application.

What is claimed is:

1. A touch screen-based electronic book automatic scrolling control method, comprising:

detecting a leftmost column of touch points of a touch screen to obtain an ordinate value $y_l$ of a touch point that has a smallest ordinate value;

detecting a rightmost column of touch points of the touch screen to obtain an ordinate value $y_r$ of a touch point that has a largest ordinate value; and based on the ordinate value $y_l$ and the ordinate value $y_r$, calculating a rate at which a content currently displayed on the screen will be scrolled down, and controlling the automatic scrolling down of an electronic book according to the calculated rate;

wherein the step of, based on the ordinate value $y_l$ and the ordinate value $y_r$, calculating a rate at which the content currently displayed on the screen will be scrolled down, and controlling the automatic scrolling down of the electronic book according to the calculated rate comprises:

based on the ordinate value $y_l$ and the ordinate value $y_r$, calculating the rate at which the content currently displayed on the screen will be scrolled down according to the formula $(y_r-y_l)/Y_M$, and controlling the automatic scrolling down of the electronic book according to the calculated rate, wherein $Y_M$ is a maximum ordinate value of the touch screen.

2. The touch screen-based electronic book automatic scrolling control method according to claim 1, wherein the leftmost column of touch points of the touch screen are all the touch points whose abscissa values can satisfy x=0; the rightmost column of touch points of the touch screen are all the touch points whose abscissa values can satisfy $x=X_M$, and $X_M$ is a width of the touch screen.

3. The touch screen-based electronic book automatic scrolling control method according to claim 1, wherein the method further comprises the following step prior to the step of detecting the leftmost column of touch points of the touch screen:
 pre-starting an automatic scrolling function of the electronic book.

4. The touch screen-based electronic book automatic scrolling control method according to claim 3, wherein the method further comprises the following step prior to the step of pre-starting an automatic scrolling function of the electronic book:
 presetting an automatic scrolling control sub-menu in a menu of the electronic book, wherein the automatic scrolling control sub-menu is configured to allow a user to select to turn on or off the automatic scrolling function of the electronic book.

5. The touch screen-based electronic book automatic scrolling control method according to claim 3, wherein the method further comprises the following step prior to the step of pre-starting an automatic scrolling function of the electronic book:
 presetting a key, and using the key for releasing the automatic scrolling function of the electronic book.

6. The touch screen-based electronic book automatic scrolling control method according to claim 5, wherein the key is a touch key or a physical key.

7. The touch screen-based electronic book automatic scrolling control method according to claim 1,
 wherein the method further comprises the following step prior to the step of, based on the ordinate value $y_l$ and the ordinate value $y_r$, calculating a rate at which the content currently displayed on the screen will be scrolled down, and controlling the automatic scrolling down of the electronic book according to the rate:
 detecting the leftmost column of touch points of a touch screen to obtain the ordinate value $y_r$ of a touch point that has the largest ordinate value; and
 detecting the rightmost column of touch points of the touch screen to obtain the ordinate value $y_l$ of a touch point that has the smallest ordinate value.

8. A mobile terminal, comprising a touch screen, a central processing unit, wherein the central processing unit comprises:
 a touch point detecting module, which is configured to detect the leftmost column of touch points of a touch screen to obtain an ordinate value $y_l$ of a touch point that has a smallest ordinate value; and is configured to detect the rightmost column of touch points of the touch screen to obtain an ordinate value $y_r$ of a touch point that has a largest ordinate value; and
 a scrolling control module, which is configured to, based on the ordinate value $y_l$ and the ordinate value $y_r$, calculate a rate at which the content currently displayed on the screen will be scrolled down, and control the automatic scrolling down of an electronic book according to the calculated rate;
 wherein the scrolling control module is configured to, based on the ordinate value $y_l$ and the ordinate value $y_r$, calculate a rate at which the content currently displayed on the screen will be scrolled down according to the formula $(y_r-y_l)/Y_M$, and control the automatic scrolling down of an electronic book according to the calculated rate, wherein $Y_M$ is a maximum ordinate value of the touch screen.

9. The mobile terminal according to claim 8, wherein the touch point detecting module is configured for detecting the leftmost column of touch points of the touch screen, which are all the touch points whose abscissa values can satisfy $x=0$, and is configured for detecting the rightmost column of touch points of the touch screen, which are all the touch points whose abscissa values can satisfy $x=X_M$, and $X_M$ is a width of the touch screen.

10. The mobile terminal according to claim 8, wherein the central processing unit further comprises:
 a function starting module, which is configured for pre-starting an automatic scrolling function of the electronic book.

11. The mobile terminal according to claim 10, wherein the central processing unit further comprises:
 a first pre-setting module, which is configured for presetting an automatic scrolling control sub-menu in a menu of the electronic book; and the automatic scrolling control sub-menu is configured for allowing a user to select to turn on or off the automatic scrolling function of the electronic book.

12. The mobile terminal according to claim 10, wherein the central processing unit further comprises:
 a second pre-setting module, which is configured for presetting a key, and using key for releasing the automatic scrolling function of the electronic book.

* * * * *

UNITED STATES PATENT AND TRADEMARK OFFICE
CERTIFICATE OF CORRECTION

PATENT NO.       : 10,540,078 B2
APPLICATION NO.  : 15/768778
DATED            : January 21, 2020
INVENTOR(S)      : Bin Yu et al.

It is certified that error appears in the above-identified patent and that said Letters Patent is hereby corrected as shown below:

On the Title Page

Item (22) PCT Filed:
"Jul. 12, 2016" should be changed to -- Dec. 7, 2016 --

Item (30) Foreign Application Priority Data:
"Jun. 4, 2016" should be changed to -- Apr. 6, 2016 --

Signed and Sealed this
Sixteenth Day of June, 2020

Andrei Iancu
*Director of the United States Patent and Trademark Office*